(12) United States Patent
Murphy et al.

(10) Patent No.: US 9,953,476 B2
(45) Date of Patent: Apr. 24, 2018

(54) CAPACITIVE VEHICLE ENTRY CONTROL

(71) Applicant: DELPHI TECHNOLOGIES, INC., Troy, MI (US)

(72) Inventors: Morgan D. Murphy, Kokomo, IN (US); Kevin J. Hawes, Greentown, IN (US); Kris R. Stark, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/204,036

(22) Filed: Jul. 7, 2016

(65) Prior Publication Data
US 2018/0012431 A1 Jan. 11, 2018

(51) Int. Cl.
| | | |
|---|---|---|
| *G07C 9/00* | (2006.01) | |
| *E05F 15/73* | (2015.01) | |
| *B60R 25/20* | (2013.01) | |
| *E05F 15/46* | (2015.01) | |
| *E05B 81/78* | (2014.01) | |

(52) U.S. Cl.
CPC ...... *G07C 9/00111* (2013.01); *B60R 25/2054* (2013.01); *E05F 15/46* (2015.01); *E05F 15/73* (2015.01); *E05B 81/78* (2013.01); *G07C 2009/00769* (2013.01)

(58) Field of Classification Search
CPC ...... G07C 9/00111; G07C 2009/00769; G01D 5/2405; H03K 17/955; E05F 15/46; E05F 15/20; E05F 15/73; E05F 15/40; E05Y 2900/531; E05Y 2400/45; B60R 25/2054; E05B 81/78

USPC ........ 340/5.62, 562, 561; 318/478; 324/658, 324/661
See application file for complete search history.

(56) References Cited

U.S. PATENT DOCUMENTS

| | | | | |
|---|---|---|---|---|
| 7,116,117 | B2 * | 10/2006 | Nakano | H03K 17/955 324/658 |
| 7,126,453 | B2 * | 10/2006 | Sandau | E05B 81/78 307/10.1 |
| 8,058,993 | B2 * | 11/2011 | Hammerschmidt | G01D 5/2405 340/562 |
| 9,199,608 | B2 * | 12/2015 | Newman | B60R 25/2027 |
| 9,447,604 | B2 * | 9/2016 | Witte | E05B 77/34 |
| 2001/0052839 | A1 | 12/2001 | Nahata et al. | |
| 2005/0179445 | A1 * | 8/2005 | Nakano | H03K 17/955 324/661 |
| 2011/0313619 | A1 * | 12/2011 | Washeleski | E05F 15/40 701/36 |

(Continued)

FOREIGN PATENT DOCUMENTS

EP 1 715 462 A1 10/2006

*Primary Examiner* — Ali Neyzari
(74) *Attorney, Agent, or Firm* — Lawrence D. Hazelton

(57) ABSTRACT

An illustrative example method of operating a capacitive vehicle entry control device includes: determining a plurality of capacitance values of the vehicle entry control device during a measurement period; determining an average capacitance of the plurality of capacitance values; determining whether the determined average capacitance exceeds an average threshold; determining a range of the plurality of capacitance values; determining whether the determined range exceeds a range threshold; and initiating a vehicle entry process when the determined average capacitance exceeds the average threshold or when the determined range exceeds the range threshold.

19 Claims, 2 Drawing Sheets

(56) References Cited

U.S. PATENT DOCUMENTS

| | | | |
|---|---|---|---|
| 2013/0311039 A1* | 11/2013 | Washeleski | E05F 15/40 701/36 |
| 2015/0330768 A1* | 11/2015 | Sieg | G01B 7/14 324/658 |
| 2016/0118981 A1* | 4/2016 | Lim | H03K 17/962 327/517 |
| 2016/0251891 A1* | 9/2016 | Herthan | B60R 25/2054 49/31 |

* cited by examiner

CAPACITIVE VEHICLE ENTRY CONTROL

BACKGROUND

Modern day vehicles include a variety of electronic systems for the convenience of a vehicle owner. Vehicle door lock systems are one example. A vehicle owner no longer needs to insert a physical key into a door lock on the outside of a vehicle to unlock a door for purpose of entering the vehicle. Capacitive detection systems allow for a control unit on the vehicle to communicate with an authentication device carried by the vehicle owner upon detecting an individual's hand on or near a door handle. If the control unit obtains appropriate authentication information, the door is automatically unlocked and the individual only needs to manipulate the door handle once unlocked.

Most such door systems operate in one of two general ways. Some such systems measure a rate of change in capacitance while others attempt to measure absolute capacitance for purposes of determining when an individual is intending to open a door. One shortcoming associated with systems that rely on a rate of change is that they are subject to false detections when conditions around the vehicle affect the manner in which the hand detection device operates. For example, when the vehicle is exposed to rain, the presence of water can change the capacitance in a manner that the system interprets as an attempt to open a vehicle door. False detections are undesirable because they result in the control unit attempting to communicate with an authentication device. Such communications require electrical power and may tend to drain the vehicle battery.

One drawback associated with systems that rely upon absolute capacitance measurements is that an individual wearing a glove may be frustrated that the door is not unlocked in a timely fashion because the glove is interfering with the systems' ability to detect the individual's hand.

There is a need for improvements in vehicle entry systems that utilize capacitive-based detection techniques to avoid false positive detections for saving energy and to more consistently detect an attempted vehicle entry by an authorized individual.

SUMMARY

An illustrative example method of operating a capacitive entry control device includes: determining a plurality of capacitance values of the vehicle entry control device during a measurement period; determining an average capacitance of the plurality of capacitance values; determining whether the determined average capacitance exceeds an average threshold; determining a range of the plurality of capacitance values; determining whether the determined range exceeds a range threshold; and initiating a vehicle entry process when the determined average capacitance exceeds the average threshold or when the determined range exceeds the range threshold.

In an example embodiment having one or more features of the method of the previous paragraph, initiating the vehicle entry process includes attempting to detect a signaling device in a vicinity of the vehicle entry control device.

In an example embodiment having one or more features of the method of either of the previous paragraphs, initiating the vehicle entry process includes transmitting a signal to an authorization signaling device, and determining that the vehicle entry is authorized when an authorizing response is received from the authorization signaling device.

An example embodiment having one or more features of the method of any of the previous paragraphs includes determining that a false positive condition occurs when the vehicle entry process remains incomplete after the initiating, and increasing at least one of the average threshold or the range threshold from an initial preselected value by a preselected increment when the false positive condition occurs.

An example embodiment having one or more features of the method of any of the previous paragraphs includes increasing the average threshold or the range threshold for each of a series of false positive conditions until a preselected upper limit on the average threshold or the range threshold is reached.

An example embodiment having one or more features of the method of any of the previous paragraphs includes increasing the average threshold or the range threshold for each of a series of false positive conditions until the false positive condition stops occurring.

An example embodiment having one or more features of the method of any of the previous paragraphs includes resetting the average threshold or the range threshold to the initial preselected value after a predetermined time has passed since a most recent detection of a change in the capacitance.

An example embodiment having one or more features of the method of any of the previous paragraphs includes determining that the vehicle entry process is successful after initiating that process; determining a first difference between the determined average and the average threshold corresponding to the successful vehicle entry process; determining a second difference between the determined range and the range threshold corresponding to the successful vehicle entry process; and decreasing the average threshold by a preselected amount when the first difference is less than the second difference or decreasing the range threshold by a preselected amount when the second difference is less than the first difference.

In an example embodiment having one or more features of the method of any of the previous paragraphs, the capacitive vehicle entry control device is associated with a vehicle door handle, initiating the vehicle entry process includes determining that an authorized signaling device is near the vehicle door handle prior to unlocking the door; and the method includes: determining that a user attempted to manipulate the vehicle door handle before the vehicle door was unlocked; determining a rate of change in the determined plurality of capacitance values preceding the user attempt to manipulate the vehicle door handle; and using the determined rate of change for at least one subsequent determination whether to initiate the vehicle entry process.

In an example embodiment having one or more features of the method of any of the previous paragraphs, using the determined rate of change for at least one subsequent determination whether to initiate the vehicle entry process includes: defining a user rate of change based on the determined rate of change; determining a subsequent plurality of capacitance values; determining a subsequent rate of change of at least some of the subsequent plurality of capacitance values; and initiating the vehicle entry process when the determined subsequent rate of change corresponds to the user rate of change.

An illustrative example embodiment of a capacitive vehicle entry control device includes at least one capacitive sensor having a capacitance that changes in response to the presence of a portion of an individual's body, and a controller comprising a processor and memory associated with the processor. The controller is configured to: determine a plurality of capacitance values of the vehicle entry control device during a measurement period, determine an average capacitance of the plurality of capacitance values, determine whether the determined average capacitance exceeds an average threshold, determine a range of the plurality of capacitance values, determine whether the determined range exceeds a range threshold, and initiate a vehicle entry process when the determined average capacitance exceeds the average threshold or when the determined range exceeds the range threshold.

In an example embodiment having one or more features of the device of the previous paragraph, the controller is configured to initiate the vehicle entry process by attempting to detect a signaling device in a vicinity of the vehicle entry control device.

In an example embodiment having one or more features of the device of either of the previous paragraphs, the controller is configured to initiate the vehicle entry process by transmitting a signal to an authorization signaling device, and determining that vehicle entry is authorized when an authorizing response is received from the authorization signaling device.

In an example embodiment having one or more features of the device of any of the previous paragraphs, the controller is configured to determine that a false positive condition occurs when the vehicle entry process remains incomplete after the initiating, and to increase at least one of the average threshold or the range threshold from an initial preselected value by a preselected increment when the false positive condition occurs.

In an example embodiment having one or more features of the device of any of the previous paragraphs, the controller is configured to increase the average threshold or the range threshold for each of a series of false positive conditions until a preselected upper limit on the average threshold or the range threshold is reached.

In an example embodiment having one or more features of the device of any of the previous paragraphs, the controller is configured to increase the average threshold or the range threshold responsive to each of a series of false positive conditions until the false positive condition stops occurring.

In an example embodiment having one or more features of the device of any of the previous paragraphs, the controller is configured to reset the average threshold or the range threshold to the initial preselected value after a predetermined time has passed since the most recent detection of a change in the capacitance.

In an example embodiment having one or more features of the device of any of the previous paragraphs, the controller is configured to: determine that the vehicle entry process is successful after the process was initiated; determine a first difference between the determined average and the average threshold corresponding to the successful vehicle entry process; determine a second difference between the determined range and the range threshold corresponding to the successful vehicle entry process; and decrease the average threshold by a preselected amount when the first difference is less than the second difference or decrease the range threshold by a preselected amount when the second difference is less than the first difference.

In an example embodiment having one or more features of the device of any of the previous paragraphs, the capacitive vehicle entry control device is associated with a vehicle door handle and the controller is configured to: initiate the vehicle entry process based upon determining that an authorized signaling device is near the vehicle door handle prior to unlocking the door, determine that a user attempted to manipulate the vehicle door handle before the vehicle door was unlocked, determine a rate of change in the determined plurality of capacitance values preceding the user attempt to manipulate the vehicle door handle, and use the determined rate of change for at least one subsequent determination whether to initiate the vehicle entry process.

In an example embodiment having one or more features of the device of any of the previous paragraphs, the controller is configured to use the determined rate of change for at least one subsequent determination whether to initiate the vehicle entry process by defining a user rate of change based on the determined rate of change; determining a subsequent plurality of capacitance values; determining a subsequent rate of change of at least some of the subsequent plurality of capacitance values; and initiating the vehicle entry process when the determined subsequent rate of change corresponds to the user rate of change.

An illustrative example embodiment of a capacitive vehicle entry control device includes at least one capacitive sensor having a capacitance that changes responsive to the presence of a portion of an individual's body; and a controller comprising a processor and memory associated with the processor, the controller being configured to initiate a vehicle entry process based on a change in the capacitance of the sensor, determine whether the vehicle entry process is completed; and adjust a threshold used for determining when to initiate the vehicle entry process in a manner that depends on whether the vehicle entry process is completed.

In an example embodiment having one or more features of the device of the previous paragraph, the controller is configured to determine that a false positive condition occurs when the vehicle entry process remains incomplete after the vehicle entry process was initiated and increase the threshold from an initial preselected value by a preselected increment when the false positive condition occurs.

In an example embodiment having one or more features of the device of either of the previous paragraphs, the controller is configured to increase the threshold responsive to each of a series of false positive conditions until a preselected upper limit on the threshold is reached.

In an example embodiment having one or more features of the device of any of the previous paragraphs, the controller is configured to increase the threshold responsive to each of a series of false positive conditions until the false positive condition stops occurring.

In an example embodiment having one or more features of the device of any of the previous paragraphs, the controller is configured to determine a plurality of capacitance values of the vehicle entry control device during a measurement period; determine an average capacitance of the plurality of capacitance values; determine whether the determined average capacitance exceeds an average threshold; determine a range of the plurality of capacitance values; determine whether the determined range exceeds a range threshold; initiate the vehicle entry process when the determined average capacitance exceeds the average threshold or when the determined range exceeds the range threshold; determine that the vehicle entry process is successful after the process was initiated; determine a first difference between the determined average and the average threshold corresponding to the successful vehicle entry process; determine a second difference between the determined range and the range threshold corresponding to the successful vehicle entry process; and decrease the average threshold by a preselected amount when the first difference is less than the second difference or decrease the range threshold by a preselected amount when the second difference is less than the first difference.

Various features and advantages of at least one disclosed embodiment will become apparent to those skilled in the art from the following detailed description. The drawings that accompany the detailed description can be briefly described as follows.

DETAILED DESCRIPTION

Embodiments of a capacitive vehicle entry control system like the example embodiment discussed below utilize a dual-threshold process that yields improved detection and accuracy in system operation. With such embodiments, higher threshold values may be used without increasing unnecessary authentication requests or the likelihood that an individual will attempt to pull on a door handle before the authentication process is compete. The disclosed example approach allows for increased system response without increasing false positive detections that otherwise could introduce undesired power consumption.

Figure 1:
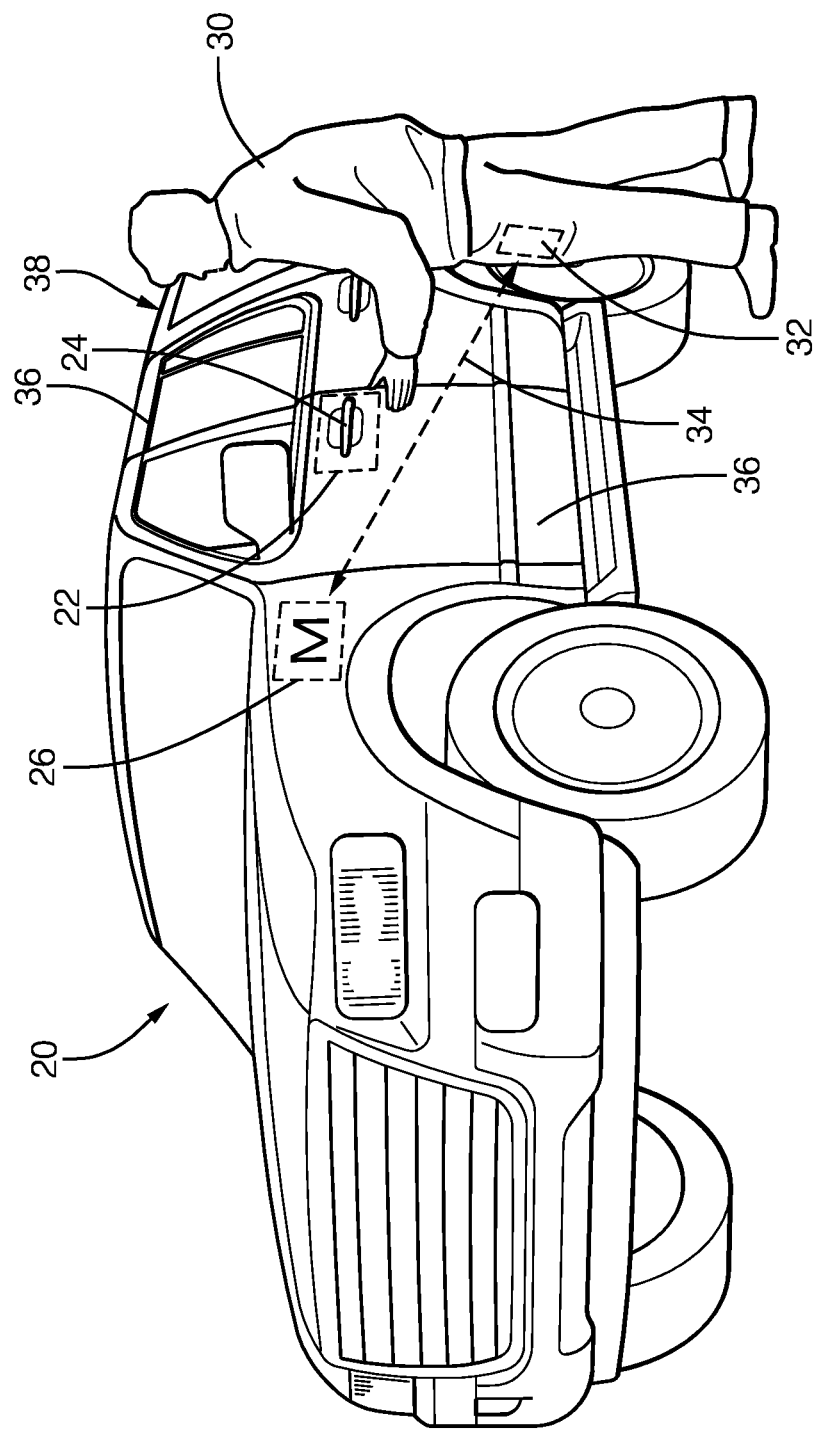
FIG. 1 schematically illustrates a vehicle including a capacitive vehicle entry control device designed according to an embodiment of this invention.

FIG. 1 illustrates a vehicle 20 including a capacitive vehicle entry control device designed according to an embodiment of this invention. A capacitive sensor 22 is associated with a door handle 24. The capacitive sensor 22 may be associated with or integrated with the door handle 24 in a variety of known manners. The capacitive sensor 22 utilizes known capacitive sensing techniques. Those skilled in the art who have the benefit of this description will be able to select an appropriate capacitive sensor arrangement to meet the needs of their particular situation. Therefore, no further explanation of the capacitive sensor 22 is provided in this description.

A controller 26 includes at least one processor or computing device and memory associated with the processor. The controller 26 obtains information from the capacitive sensor 22 to determine when an individual 30 is attempting to access or enter the vehicle interior. For example, the controller 26 determines when the capacitive sensor 22 detects the presence of an individual's hand on or near the door handle 24.

When an appropriate output is provided by the capacitive sensor 22, the controller 26 initiates a vehicle entry process by attempting to communicate with an authentication signaling device 32, which may be carried by the individual 30. Signaling between the controller 26 and the authentication signaling device 32 is schematically shown at 34. Such signaling may include a polling or locating signal from the controller 26 to which the authentication signaling device 32 responds by providing identification information to the controller 26. The controller 26 initiates a vehicle entry process by automatically unlocking the vehicle door lock associated with the handle 24 when appropriate authorization information is received indicating the presence of the authorization signaling device 32 within a vicinity of the door handle 24.

While the door handle 24 is used as an example vehicle component associated with the capacitive sensor 22, other portions of the vehicle may be accessed based on operation of additional capacitive sensors. For example, separate capacitive sensors may be associated with each of the vehicle doors 36 and the vehicle hatch 38 (or trunk depending on the configuration of the vehicle). The controller 26 selectively controls the ability of an individual to enter or access the interior of the vehicle 20 depending on whether appropriate authorization information is received from an authorization signaling device 32 within close proximity to the vehicle 20.

Figure 2:
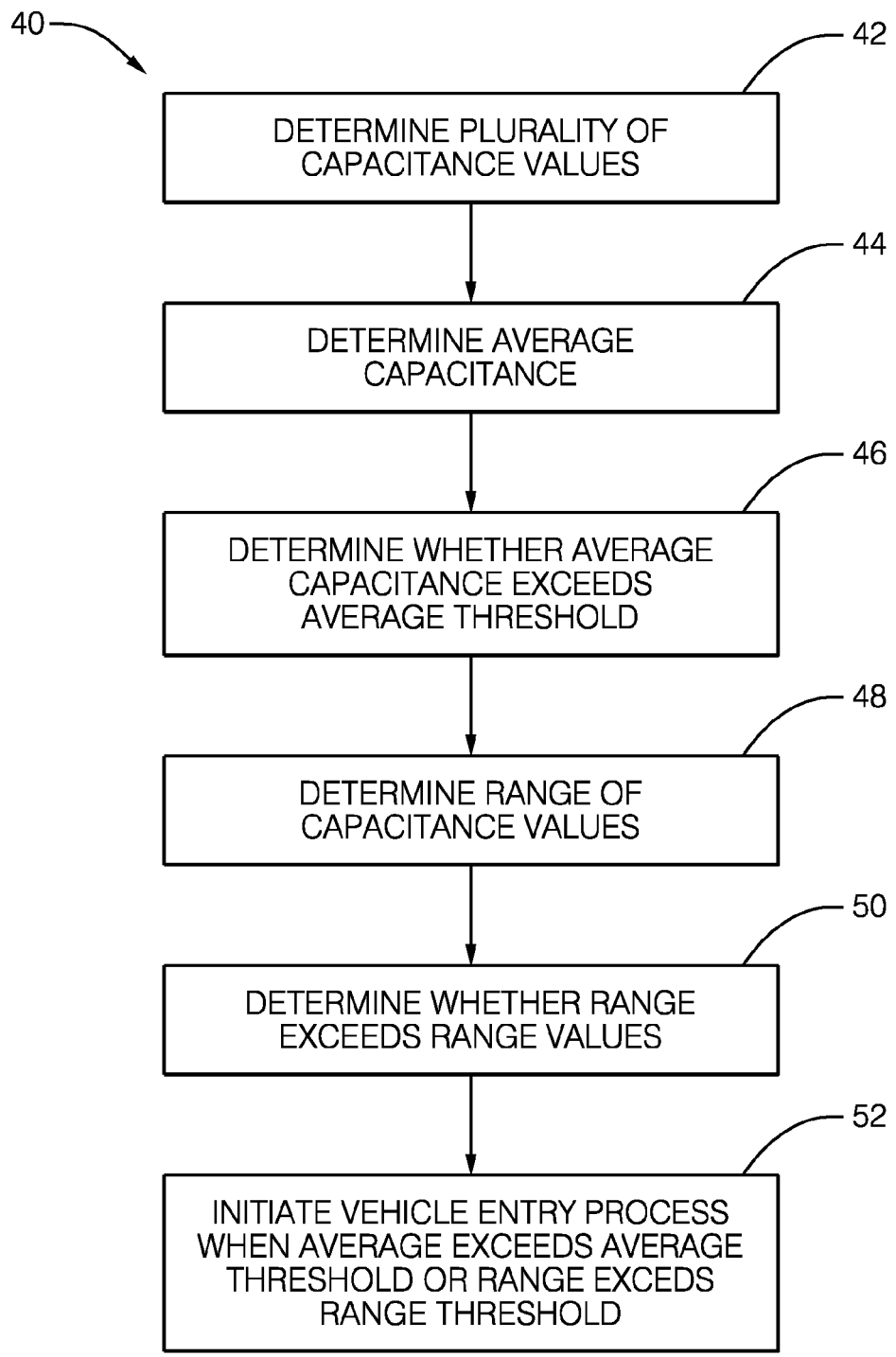
FIG. 2 is a flowchart diagram summarizing an example control strategy.

FIG. 2 includes a flowchart diagram 40 that summarizes operation of the capacitive vehicle entry control device in a manner that conserves power and enhances system accuracy and responsiveness. The example approach includes utilizing an average capacitance based on a plurality of capacitance values, a range of the plurality of capacitance values, and respective thresholds for the average and the range.

At 42, the controller 26 determines a plurality of capacitance values based on output from the capacitive sensor 22. In this example, there are N consecutive capacitance value readings during a selected measurement period. For example N may be 12 and the measurement period may be several milliseconds. The controller 26 can obtain such measurements from the capacitive sensor 22 on an ongoing basis without consuming much power. In some example embodiments, the controller 26 continuously monitors the output from the capacitive sensor 22 under at least selected conditions and uses sets of N capacitance values for vehicle entry control determinations.

At 44, the controller 26 determines an average capacitance based on the plurality of capacitance values. At 46, the controller 26 determines whether the average capacitance exceeds a preselected average threshold.

At 48, the controller 26 determines a range of the plurality of capacitance values. At 50, the controller 26 determines whether the range exceeds a preselected range threshold.

If the average capacitance exceeds the average threshold or the range exceeds the range threshold, then the controller 26 initiates a vehicle entry process at 52. The vehicle entry process includes attempting to detect the authorization signaling device 32 in a vicinity of the vehicle entry control device. For example, the controller 26 is configured to initiate the vehicle entry process by transmitting a signal to the authorization signaling device 32 and determining that vehicle entry is authorized when an authorizing response is received from the authorization signaling device. Utilizing the two thresholds of this example embodiment allows for having higher threshold values, which eliminates or reduces false detections and non-detections. Utilizing the two thresholds of this example embodiment also allows for an improved, quicker response time to reduce inconvenience or frustration for a vehicle owner that may attempt to open the door before the door lock has been automatically activated.

The controller 26 in this example includes learning or adapting capability. For example, when a successful vehicle entry is complete, the controller 26 determines a first difference between the average capacitance and the average threshold. The controller 26 also determines a second difference between the range and the range threshold. If the first difference is less than the second difference, the controller 26 decreases the average threshold used for at least one subsequent process of determining whether to unlock the vehicle 20. If the second difference is less than the first, the controller 26 reduces the range threshold for at least one subsequent vehicle entry control process.

Under some conditions, the example process summarized in FIG. 2 may result in a false positive condition in which the vehicle entry process is initiated but the door handle 24 is not activated within a predetermined time from initiation.

Another example false positive condition includes the controller 26 determining to initiate the vehicle entry process followed by not detecting an appropriate authorization signaling device within a vicinity of the vehicle 20. Example conditions under which such a false positive result may occur includes the presence of ice or snow on or near the door handle 24.

Some example embodiments include a learning algorithm to reduce or eliminate such false positive results. In such embodiments, the controller 26 increases at least one of the average threshold or the range threshold using a preselected increment. Increasing at least one of those thresholds decreases the likelihood of a false positive result.

In situations in which repeated false positive conditions occur, the controller 26 repeatedly adjusts at least one of the range threshold or the average threshold using a preselected increment. In some examples, the controller 26 repeatedly increases at least one of those thresholds until no further false positive detection occurs. This approach may be useful under conditions, for example, where something, such as ice, is present and causing an output from the capacitive sensor 22 that apparently indicates the presence of an individual's hand near a door handle. By repeatedly increasing the range threshold or the average threshold until the false positive condition stops occurring, the controller 26 is able to conserve battery power instead of repeatedly signaling to attempt to locate an appropriate signaling device in a vicinity of the vehicle.

In some embodiments, the controller 26 repeatedly increases at least one of the range threshold or the average threshold until a preselected upper limit on that threshold is reached.

Adjusting at least one of the thresholds to avoid false positive detections may include adjusting only one of those thresholds or both. Adjusting only one of them allows for addressing the situation causing false positive results while maintaining an ability to detect the subsequent approach of an individual utilizing at least one of those thresholds.

Some example controllers 26 include another learning algorithm for addressing situations in which an individual user tends to rapidly reach for and pull on a door handle more quickly than the system is able to respond by automatically unlocking the door. If the controller 26 detects that an individual has attempted to open the door before it was automatically unlocked, the controller 26 determines a rate of change in the most recent set of capacitive values. The controller 26 then determines a user rate of change based on the determined rate of change. The controller 26 then utilizes the user rate of change for a subsequent determination whether to initiate a vehicle entry process for automatically unlocking a door. The controller 26 compares a subsequent rate of change of at least some subsequent capacitance values to the defined user rate of change and initiates the vehicle entry process when the subsequent rate of change corresponds to the user rate of change. This adaptation capability of the example embodiment provides further robustness to the disclosed embodiment and increases system performance and user satisfaction.

Utilizing two different thresholds and two different output parameters improves system performance without utilizing additional power.

Various features are described in connection with the example embodiments. Not all of those features need be included in every embodiment of this invention. Some embodiments include different combinations of selected ones of those features compared to other embodiments. Additionally, to the extent that any embodiments are disclosed as separate embodiments with differing features, any such features may be combined into a single embodiment.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of operating a capacitive vehicle entry control device, the method comprising:
   determining a plurality of capacitance values of the vehicle entry control device during a measurement period;
   determining an average capacitance of the plurality of capacitance values;
   determining whether the determined average capacitance exceeds an average threshold;
   determining a range of the plurality of capacitance values;
   determining whether the determined range exceeds a range threshold; and
   initiating a vehicle entry process when the determined average capacitance exceeds the average threshold or when the determined range exceeds the range threshold, wherein initiating the vehicle entry process comprises attempting to detect a signaling device in a vicinity of the vehicle entry control device, transmitting a signal to an authorization signaling device, and determining that vehicle entry is authorized when an authorizing response is received from the authorization signaling device.

2. The method of claim 1, comprising
   determining that a false positive condition occurs when the vehicle entry process remains incomplete after the initiating; and
   increasing at least one of the average threshold or the range threshold from an initial preselected value by a preselected increment when the false positive condition occurs.

3. The method of claim 2, comprising
   increasing the at least one of the average threshold or the range threshold responsive to each of a series of false positive conditions until a preselected upper limit on the at least one of the average threshold or the range threshold is reached.

4. The method of claim 2, comprising
   increasing the at least one of the average threshold or the range threshold responsive to each of a series of false positive conditions until the false positive condition stops occurring.

5. The method of claim 4, comprising
   resetting the at least one of the average threshold or the range threshold to the initial preselected value after a predetermined time has passed since a most recent detection of a change in the capacitance.

6. The method of claim 1, comprising
   determining that the vehicle entry process is successful after the initiating;
   determining a first difference between the determined average and the average threshold corresponding to the successful vehicle entry process;
   determining a second difference between the determined range and the range threshold corresponding to the successful vehicle entry process; and decreasing the average threshold by a preselected amount when the first difference is less than the second difference or decreasing the range threshold by a preselected amount when the second difference is less than the first difference.

7. The method of claim 1, wherein
the capacitive vehicle entry control device is associated with a vehicle door handle;
initiating the vehicle entry process includes determining that an authorized signaling device is near the vehicle door handle prior to unlocking the door; and
the method comprises
determining that a user attempted to manipulate the vehicle door handle before the vehicle door was unlocked;
determining a rate of change in the determined plurality of capacitance values preceding the user attempt to manipulate the vehicle door handle; and
using the determined rate of change for at least one subsequent determination whether to initiate the vehicle entry process.

8. The method of claim 7, wherein using the determined rate of change for at least one subsequent determination whether to initiate the vehicle entry process comprises:
defining a user rate of change based on the determined rate of change;
determining a subsequent plurality of capacitance values;
determining a subsequent rate of change of at least some of the subsequent plurality of capacitance values; and
initiating the vehicle entry process when the determined subsequent rate of change corresponds to the user rate of change.

9. A capacitive vehicle entry control device, comprising:
at least one capacitive sensor having a capacitance that changes responsive to the presence of a portion of an individual's body; and
a controller comprising a processor and memory associated with the processor, the controller being configured to
determine a plurality of capacitance values of the vehicle entry control device during a measurement period;
determine an average capacitance of the plurality of capacitance values;
determine whether the determined average capacitance exceeds an average threshold;
determine a range of the plurality of capacitance values;
determine whether the determined range exceeds a range threshold; and
initiate a vehicle entry process when the determined average capacitance exceeds the average threshold or when the determined range exceeds the range threshold, wherein the controller is configured to initiate the vehicle entry process by attempting to detect a signaling device in a vicinity of the vehicle entry control device, transmitting a signal to an authorization signaling device, and determining that vehicle entry is authorized when an authorizing response is received from the authorization signaling device.

10. The device of claim 9, wherein the controller is configured to
determine that a false positive condition occurs when the vehicle entry process remains incomplete after the initiating; and
increase at least one of the average threshold or the range threshold from an initial preselected value by a preselected increment when the false positive condition occurs.

11. The device of claim 10, wherein the controller is configured to
increase the at least one of the average threshold or the range threshold responsive to each of a series of false positive conditions until a preselected upper limit on the at least one of the average threshold or the range threshold is reached.

12. The device of claim 10, wherein the controller is configured to
increase the at least one of the average threshold or the range threshold responsive to each of a series of false positive conditions until the false positive condition stops occurring.

13. The device of claim 12, wherein the controller is configured to
reset the at least one of the average threshold or the range threshold to the initial preselected value after a predetermined time has passed since a most recent detection of a change in the capacitance.

14. The device of claim 9, wherein the controller is configured to:
determine that the vehicle entry process is successful after the process was initiated;
determine a first difference between the determined average and the average threshold corresponding to the successful vehicle entry process;
determine a second difference between the determined range and the range threshold corresponding to the successful vehicle entry process; and
decrease the average threshold by a preselected amount when the first difference is less than the second difference or decrease the range threshold by a preselected amount when the second difference is less than the first difference.

15. The device of claim 9, wherein
the capacitive vehicle entry control device is associated with a vehicle door handle; and
the controller is configured to
initiate the vehicle entry process based upon determining that an authorized signaling device is near the vehicle door handle prior to unlocking the door,
determine that a user attempted to manipulate the vehicle door handle before the vehicle door was unlocked,
determine a rate of change in the determined plurality of capacitance values preceding the user attempt to manipulate the vehicle door handle, and
use the determined rate of change for at least one subsequent determination whether to initiate the vehicle entry process.

16. The device of claim 15, wherein the controller is configured to use the determined rate of change for at least one subsequent determination whether to initiate the vehicle entry process by
defining a user rate of change based on the determined rate of change;
determining a subsequent plurality of capacitance values;
determining a subsequent rate of change of at least some of the subsequent plurality of capacitance values; and
initiating the vehicle entry process when the determined subsequent rate of change corresponds to the user rate of change.

17. A capacitive vehicle entry control device, comprising:
at least one capacitive sensor having a capacitance that changes responsive to the presence of a portion of an individual's body; and a controller comprising a processor and memory associated with the processor, the controller being configured to initiate a vehicle entry process based on a change in the capacitance of the sensor;

determine whether the vehicle entry process is completed, adjust a threshold used for determining when to initiate the vehicle entry process in a manner that depends on whether the vehicle entry process is completed, determine that a false positive condition occurs when the vehicle entry process remains incomplete after the vehicle entry process was initiated, increase the threshold from an initial preselected value by a preselected increment when the false positive condition occurs, and increase the threshold responsive to each of a series of false positive conditions until a preselected upper limit on the threshold is reached.

18. The device of claim 17, wherein the controller is configured to increase the threshold responsive to each of a series of false positive conditions until the false positive condition stops occurring.

19. The device of claim 17, wherein the controller is configured to determine a plurality of capacitance values of the vehicle entry control device during a measurement period;

determine an average capacitance of the plurality of capacitance values;

determine whether the determined average capacitance exceeds an average threshold;

determine a range of the plurality of capacitance values;

determine whether the determined range exceeds a range threshold;

initiate the vehicle entry process when the determined average capacitance exceeds the average threshold or when the determined range exceeds the range threshold;

determine that the vehicle entry process is successful after the process was initiated;

determine a first difference between the determined average and the average threshold corresponding to the successful vehicle entry process;

determine a second difference between the determined range and the range threshold corresponding to the successful vehicle entry process; and decrease the average threshold by a preselected amount when the first difference is less than the second difference or decrease the range threshold by a preselected amount when the second difference is less than the first difference.

* * * * *